US006529154B1

(12) United States Patent
Schramm, Jr. et al.

(10) Patent No.: US 6,529,154 B1
(45) Date of Patent: Mar. 4, 2003

(54) METHOD AND APPARATUS FOR READING TWO DIMENSIONAL IDENTIFICATION SYMBOLS USING RADAR TECHNIQUES

(75) Inventors: Harry F. Schramm, Jr., Winchester, TN (US); Donald L. Roxby, Gurley, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/528,795

(22) Filed: Mar. 16, 2000

(51) Int. Cl.[7] .......................... G01S 13/74; G01S 13/00
(52) U.S. Cl. ................. 342/44; 342/5; 342/6; 342/21; 342/42; 342/43; 342/51; 342/195
(58) Field of Search ................ 342/42–51, 60, 342/175, 195, 25, 188, 1–11, 21, 27, 28, 176, 177–186, 22

(56) References Cited

U.S. PATENT DOCUMENTS

| | | | | |
|---|---|---|---|---|
| 3,247,508 A | * | 4/1966 | Bradford et al. | 342/44 |
| 3,247,509 A | * | 4/1966 | Hamann et al. | 342/44 |
| 3,247,510 A | * | 4/1966 | Molnar et al. | 342/44 |
| 3,311,915 A | * | 3/1967 | Mori | 342/44 |
| RE26,292 E | * | 10/1967 | Bradford et al. | 342/44 |
| 3,362,025 A | * | 1/1968 | Mori | 342/44 |
| 3,366,952 A | * | 1/1968 | Mori | 342/44 |
| 3,467,962 A | * | 9/1969 | La Plume | 342/44 |
| 3,488,655 A | * | 1/1970 | Fortner | 342/44 |
| 3,521,280 A | * | 7/1970 | Janco | 342/44 |
| 5,003,600 A | * | 3/1991 | Deason et al. | 342/42 |
| 5,486,830 A | * | 1/1996 | Axline et al. | 342/43 |
| 5,767,802 A | * | 6/1998 | Kosowsky et al. | 342/25 |

\* cited by examiner

*Primary Examiner*—Bernarr E. Gregory
(74) *Attorney, Agent, or Firm*—James J. McGroary

(57) ABSTRACT

A method and apparatus are provided for sensing two-dimensional identification marks provided on a substrate or embedded within a substrate below a surface of the substrate. Micropower impulse radar is used to transmit a high risetime, short duration pulse to a focussed radar target area of the substrate having the two dimensional identification marks. The method further includes the steps of listening for radar echoes returned from the identification marks during a short listening period window occurring a predetermined time after transmission of the radar pulse. If radar echoes are detected, an image processing step is carried out. If no radar echoes are detected, the method further includes sequentially transmitting further high risetime, short duration pulses, and listening for radar echoes from each of said further pulses after different elapsed times for each of the further pulses until radar echoes are detected. When radar echoes are detected, data based on the detected echoes is processed to produce an image of the identification marks.

18 Claims, 1 Drawing Sheet

METHOD AND APPARATUS FOR READING TWO DIMENSIONAL IDENTIFICATION SYMBOLS USING RADAR TECHNIQUES

ORIGIN OF THE INVENTION

This invention was made by an employee of the United States Government and may be manufactured and used by or for the Government for Governmental purposes without the payment of royalties.

BACKGROUND OF THE INVENTION

1. Field of the Invention

The present invention relates to automatic identification systems and methods such as are used in identifying products or parts, based on coded symbols (e.g., bar codes) carried by the products or parts.

2. Background of the Invention

Technological advancements in the areas of automatic identification have reached a point in their development where a near paperless manufacturing, configuration and distribution system is achievable. The central element supporting this near paperless system is the software by which products or inventory are accounted and tracked. This software exists in various forms (such as the very mature MRP II) and in general, these variations are application dependent. A manufacturing operation relies on such a system for inventory control, product routing, and decision support for timely purchasing to fill a bill of materials for production planning. Similar software exists for tracking inventory through a logistics or property system, and the popularity of configuration management, a requirement once relegated to the aerospace industry, is growing in the commercial sector.

The current method used for interfacing with inventory and configuration management systems usually involves a mixture of manual and automated data entry. Such automated data entry commonly uses bar codes. These bar codes typically are printed on adhesive backed paper labels which are attached to the product, on the product labels, or on the product container. In grocery stores and similar consumer outlets, the bar code is a part of the label and identifies the product to the computer through the use of a scanner which scans the bar code. Inventory records are adjusted when an item is sold. The product can be tracked through its life cycle to point of sale if necessary, by use of the bar code printed on the label. However, many other consumer outlets, such as those selling automotive parts, lose the product identification when the product and its container are separated. There is no matching machine-readable identifier marked permanently on the surface of the product or embedded in the product for tracking the product through its life cycle or for use in latent validation of configuration.

The methods currently being used to image a two dimensional symbol on a product generally involve the use of laser or optical devices. Typical two dimensional symbols are discussed below and include two basic types, tiered or stacked bar codes and matrix symbols. Most of the methods used for scanning the stacked bar code versions of the two dimensional symbology family are laser based. The laser is best suited to scanning on matte finish labels or paper surfaces. The scanners for the matrix versions of the symbology family are camera based, usually a charged coupled device (CCD) or CMOS. Use of the CCD is the preferred method for scanning symbols that have been applied directly to the substrate of a product.

These scanning methods achieve their scanning function by optically imaging those marks which are visible on the substrate. The sensing mechanism is based on illumination, whether natural or induced, of one symbol to make the image of the symbol optically apparent to the scanner. Thus, these scanning methods are not suitable for invisible surface marks or subsurface marks which cannot be made visible without stimulation, e.g., UV ink.

The standard method for marking products with identification marks or symbols involves the use of methods such as label application, ink jet printing, machine engraving, laser etching, micro-abrasive blast, micro-machining and dot peening. These methods produce marks that are visible and must be read by optical devices, primarily lasers, CCDs and CMOS. This approach limits the location of a product identifier to the surface of the product.

In distribution and logistics applications there are usually many products packed in a container for efficient transportation. These containers can be made of cardboard, wood or other materials. With standard marking and scanning methods, labels on the outside of the container provide the only identification markings for determining the contents of the container without opening the container for examination. Further, labels fall off and get damaged.

In many applications where products have foam coverings, laminants and multi-layer features, optical methods are limited to surface identification and are not capable of interrogating surface identification marks that have been covered. Accordingly, there is no opportunity in these applications for latent validation of the configuration using optical device.

SUMMARY OF THE INVENTION

Generally speaking, the invention involves the use of radar to detect and image two dimensional identification marks or symbols for both surface and subsurface conditions.

According to a first aspect of the invention, a method is provided for sensing two-dimensional identification marks provided on or within a substrate in such a manner that the marks can be differentiated by radar from the substrate, the method comprising: transmitting a radar pulse to a target area of the substrate provided with the two dimensional identification marks, detecting radar echoes from the target area produced by radar reflection from the identification marks in response to the radar pulse; and processing data based on the echoes to produce an image of the identification marks.

In an embodiment where the identification marks are embedded in the substrate and in other applications, the radar pulse is preferably transmitted into the substrate using microwave impulse radar, and any echoes that are returned after a predetermined time after transmission of said radar pulse are detected. In this embodiment, a series of radar pulses are transmitted into the substrate at different signal depths based on the timing of any echo returns, until an echo return at signal depth corresponding to the distance to identification marks is received.

In another embodiment, the identification marks and the substrate are of different densities and the radar echoes are detected based on the density of the identification marks.

In yet another embodiment, the identification marks and the substrate are made of materials having different radar reflection characteristics, and the radar echoes are detected based on radar reflection characteristics of the identification marks.

Advantageously, the identification marks comprise a two dimensional matrix symbol, although other two dimensional marks or symbols such as tiered or stacked bar codes can also be used.

In accordance with a further aspect of the invention, an apparatus or system is provided for identifying radar reflective or radar absorptive machine-readable identification marks on a substrate, the apparatus comprising: a micropower impulse radar imager means for transmitting radar pulses to a target area including the identification marks and for receiving returned radar energy; converter means for converting the returned radar energy into information signals; computer means for analyzing the information signals to determine the information contained in the identification marks; and display means for displaying the information so obtained in a human-readable format.

Further features and advantages of the present invention will be set forth in, or apparent from, the detailed description of preferred embodiments thereof which follows.

DESCRIPTION OF THE PREFERRED EMBODIMENTS

Figure 1:
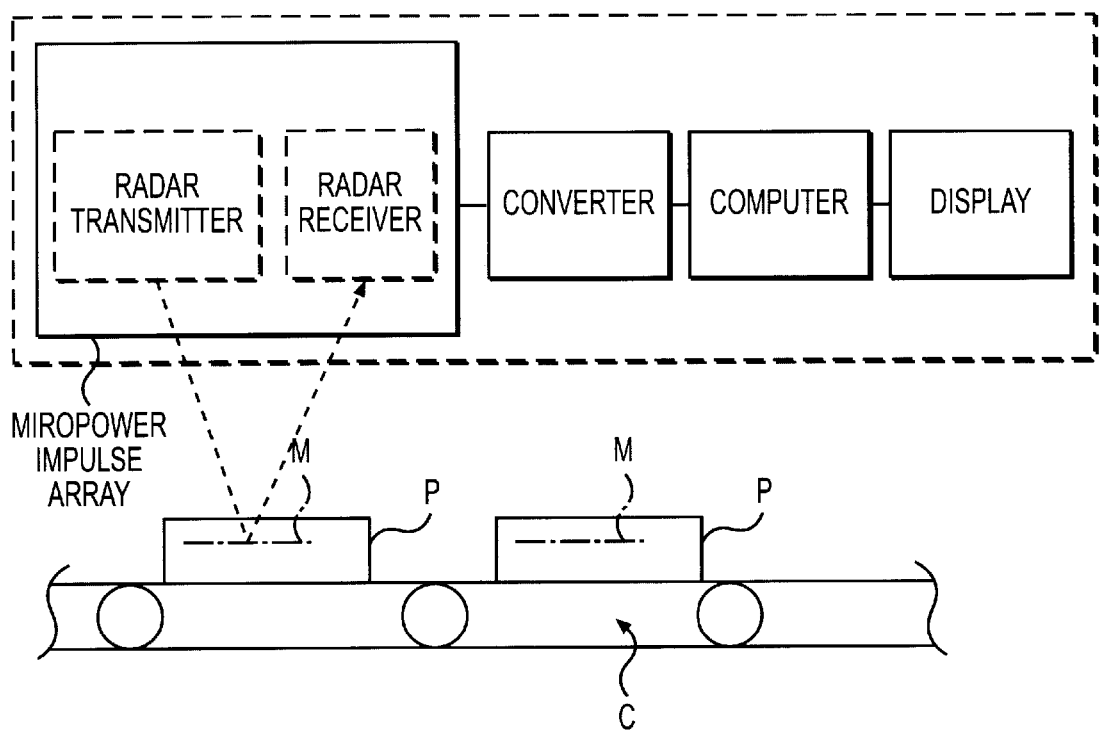
FIG. 1 is a highly schematic block diagram representation of a radar system in accordance with a preferred embodiment of the invention which can be used in carrying out one preferred embodiment of the method of the invention.

Referring to FIG. 1, a highly schematic representation is provided of a preferred radar system for carrying out the method of the invention. The system of FIG. 1 uses a micropower impulse radar (MIR) array 10 to detect marks, denoted M, which, in this example, are embedded in products or parts P carried by a conveyor C. MIR systems are conventional per se and are fully described in prior art (see, e.g., U.S. Pat. Nos. 4,641,317; 4,743,906; 4,817,057; 4,979,186; and 5,363,108, issued to Fullerton and Phillips). MIR systems transmit radar energy in a form known as Gaussian Monocycle Waves. Waves of this type differ from typical radio waves in that the former is transmitted in a burst format containing a multiplicity of different radio channels. Each individual channel contains a single weak radio signal of a very short duration (about a trillionth of a second). The receiver includes a special timer programmed to rapidly assemble the signals in each channel and to reconstruct the signals as an image. Because the radio burst is so large, the burst can easily carry the large amounts of data contained in high-density machine-readable symbols or identification marks. The high speed of the waves ensures that no channel is ever flooded, allowing a vast number of broadcasters to transmit over the same channel without interference.

In contrast to even more basic conventional radar systems as well as most other forms of radar which send out a signal and listen to every echo from that signal and interpret echoes coming from all distances, MIR systems listen only to those signals coming from a predetermined distance away or from a predetermined depth. This is done by transmitting a short duration, sharp (high risetime) pulse, waiting a preselected, precisely determined period of time, and watching for a radar echo within a short, precisely determined time window at the end of the time period. If no echo arrives during this time window, the target is either too close or too far away and the depth of scan is then adjusted until an echo is received. The depth of scan, i.e., the distance to the target corresponding to the time period set, can be adjusted to be between a few inches and up to 200 feet or more. It is also noted that conventional radar pulses are typical hundreds or even thousands of feet wide and thus produce images with limited resolution, The pulses of the MIR imager or array 10 produce a large burst of monocycle signals, including small amounts of energy, which are only a few inches wide. The radar pulse is preferably projected from a silicon germsanian microchip about the size of a pinhead which sends out 40 million radio pulses per second as part of a microcycle wave.

In general, MIR systems use radar modules arranged in an array. Each module performs individually in looking for the proper signal depth, i.e., the depth corresponding to the correct distance to the target. In FIG. 1, a radar module is formed by a radar transmitter 12 which transmits the short, sharp pulses discussed above and a radar receiver 14 which receives the reflected radar energy or echo when the signal depth is correct. A computer 16 collects the data from each pass of the MIR array 10 and processes the data into an image. The output from array 10 is presented in a digital format, after being converted to such a format by a converter 17, as necessary, so as to enable the image of an identification mark or symbol as to be decoded. The returned radar energy can be sampled and stored in memory in computer 16 prior to conversion to video signals. The stored signals can then be later retrieved from memory and then converted to video signals or images. A display unit 18 can be used to display the image in human-readable form. The stored signals can be decoded to produce a signal train representation of the identification marks which can be converted into an ASCII string for display by display unit 18. The ability of MIR to focus the radar target area and depth of investigation results in a simplified system that is inexpensive enough to enable use thereof in reading two dimensional marks or symbols in many commercial applications. The entire unit including MIR array 10, converter 15, computer 16 and display unit 18 can be made quite small and can be contained within a miniaturized container or housing indicated schematically at 19. The transmitted radar signal preferably contains discrete frequency components generally below noise level and not discernable by conventional radio receiving equipment.

Although an MIR system is the preferred system for carrying out the method of the invention, other radar including ground penetrating radar (GRP) can be used in some applications.

In addition, although an embedded identification mark or symbol is shown in FIG. 1, it is to be understood that radar can also be used when the two dimensional symbol of interest is to be raised relative to the substrate or is of a different density than the surrounding background or substrate. Further, radar is more sensitive to some materials than others because some materials have the capability of producing better radar echoes than others, and thus such radar sensitive materials can also be used in creating the identification marks or symbols.

There are, of course, a number of conventional marking techniques for applying identification symbols permanently to the surface of the product or part or for embedding the symbol within the part. Such conventional techniques will change or can be made to change, the substrate sufficiently to permit remote detection of the symbol by radar to be effective. Other conventional marking techniques can be used to deposit a material that is different enough from the substrate to be remotely sensed. Further, the symbol, whether composed of a different material or of the same material with a different density, can also be embedded in the part, and still permit remote radar sensing to capture the image thereof.

The basic identification symbols or marks themselves, i.e., their shapes and layouts, are also conventional. As indicated above, such symbols are generally classified in the automatic identification field as two dimensional symbols. Such symbols include matrix codes and their derivatives and stacked bar codes.

Figure 2:
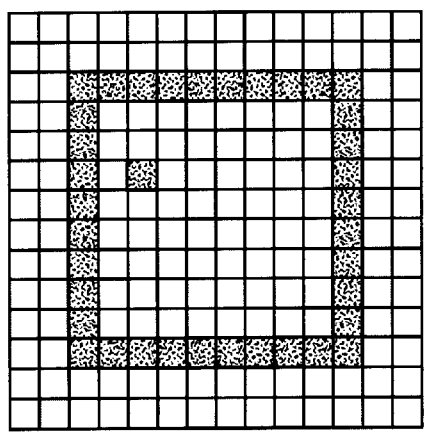
FIG. 2 is a plan view of a conventional two dimensional matrix symbol which can be used as the two dimensional identification marks or symbols detected by the method of the invention.
Figure 3:
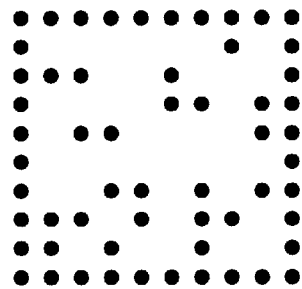
FIG. 3 is a plan view of an alternative embodiment of the matrix symbol of FIG. 2.

Referring to FIG. 2, the basic elements of a conventional matrix code are shown. The basic matrix data format is based on binary units referred to as data cells which are either a black or filled square or a mark ("on") having a value of "1" or a white or empty square or no mark ("off") having the opposite binary value of "0". A binary "1" (on) data cell is indicated in FIG. 2 by the filled in box at 20 while a binary "0" (off) data cell is indicated by the empty box at 22. The matrix includes a data frame 24 of "on" cells surrounded by a quiet zone of "off" cells. The quiet zone generally has a width of at least one data cell in each direction. The interior data field inside of frame 24 is indicated at 26 in FIG. 2 and the exterior data field or quiet zone outside of frame 24 is indicated at 28. This is the basic Vericode symbol which is described in U.S. Pat. Nos. 4,924,078 and 4,972,475, which are hereby incorporated by reference. An alternative format of the Vericode symbol, using dots 30 and blank spaces 32, is shown in FIG. 3.

Of course, there are, as indicated above, many other two dimensional symbols that can be used. Examples include matrix symbols with two sides open such as Data Matrix by Acuity CiMatrix (formerly ID Matrix) and CP Code by CP Tron, INC, or where all sides are open such as the Snowflake code by Electronic Automation of Hull, England, as well as matrix codes wherein the code is read from the inside out such as the Aztec Code by Welch Allen, the Maxicode by UPS and Code 1 by Laser Light Systems. Squares, circles and other shapes are used for orientation. It will be understood that in addition to the squares shown in FIG. 3 matrix codes can also be formed by round (FIG. 3), hexagonal or other geometrically shaped data cells arranged in some type of matrix format. Data Matrix is described in U.S. Pat. No. 4,939,354.

Although a simple linear bar code has only one dimension (in the direction of the data string), slices of these bar codes can be taken which are stacked or tiered. Such tiering produces a symbol having more than one dimension. In conventional use of such tiered bar codes, the bar code is scanned along the Y-axis to collect the information individual to the symbol and the stack is scanned along the Y-axis to capture the complete information file included in the symbol. Some popular examples of these symbols which are on the market today include Code 16K, Softstrip, PDF417, Code 49 and CodaBlock.

The machine-readable symbol can also comprise a string of optical character recognition (OCR) symbols.

There are a number of advantages provided by using the radar techniques of the invention for the imaging of two dimensional symbols on substrates as well as below the surfaces of such substrates. The first and most significant advantage over prior art is that radar is not limited to reading from the surface of the part. As discussed above, laser scanners and optical readers are surface readers, designed for labels and substrate marks having a well defined contrast between the identification marks and the background or substrate.

Below surface marking has a wide range of applications. Some of these include defense, aerospace, automotive and transportation, electronics, security, commercial sales and distribution, and biomedical. In contrast to x-ray, radar offers a safe alternative to imaging subsurface symbols. As opposed to ultrasonic and eddy current systems, contact with the part is not needed. Although radar shares an advantage with infrared and capacitance techniques in that all three can image a symbol in the dark and without contact, radar does not depend on specific dielectric constants or emissivities to perform its function. The material of the identification marks being targeted need only to be different enough from the background or substrate to be echoed.

Another advantage is that symbols marked with a material with high echo potential can be detected with radar at a distance, possibly at a range of a few hundred feet. Thus, the invention can be used as a location technique as well as an identification technique.

It is noted that the same imaging device can be used to read surface marks as well as marks below the surface of a product or matching marks within a container. This can be carried so far as to identify objects in another room through the room wall or on the other side of a structure, by imaging the symbol through that wall or structure.

One further advantage of radar is that radar enables imaging subsurface symbols in motion. This signal rate and echo determination rate is much faster than other subsurface techniques. Thus the invention can be used to inventory parts moving at high speed or even track carriers in transit.

Radar can be used not only to image the identification marks of an object, but also to determine the exact distance between the imager and the target. This has applications in the defense industry. As radar is not sensitive to vapors or thermal layers, targets can be found in the dark at night and in other low visibility situations where detection of such targets by humans and optical devices would fail.

Although the invention has been described above in relation to preferred embodiments thereof, it will be understood by those skilled in the art that variations and modifications can be effected in these preferred embodiments without departing from the scope and spirit of the invention.

What is claimed is:

1. A method for sensing coded, passive, two-dimensional identification marks provided on or within a substrate in such a manner that the marks can be differentiated by radar from the substrate, said method comprising:

transmitting a radar pulse to a target area of the substrate provided with the passive two dimensional identification marks;

detecting radar echoes from the said target area produced by radar reflection from said identification marks in response to said radar pulse;

processing data based on said echoes to produce an image of said identification marks; and processing the image to decode the coded marks.

2. A method as claimed in claim 1 wherein said identification marks are embedded in the substrate, said radar pulse is transmitted into the substrate using microwave impulse radar, and any echoes that are returned after a predetermined time after transmission of said radar pulse are detected.

3. A method as claimed in claim 2 wherein a series of radar pulses are transmitted into the substrate at different signal depths based on the timing of echo returns, until an echo return at a signal depth corresponding to the distance of the identification marks is received.

4. A method as claimed in claim 1 wherein said identification marks and said substrate are of different densities and said radar echoes are detected based on the density of the identification marks.

5. A method as claimed in claim 1 wherein said identification marks and said substrate are made of materials having different radar reflection characteristics, and said radar echoes are detected based on radar reflection characteristics of the identification marks.

6. A method as claimed in claim 1 wherein said marks comprise a two dimensional matrix symbol.

7. A method for sensing two-dimensional identification marks provided on or within a substrate in such a manner that the marks can be differentiated from the substrate, said method comprising:

using micropower impulse radar to transmit a pulse to a focussed radar target area of the substrate provided with the two dimensional identification marks;

detecting radar echoes from the said target area produced by radar reflection from said identification marks in response to said radar pulse and producing output data based thereon; and processing said output data based on said echoes to produce an image of said identification marks.

8. A method as claimed in claim 7 wherein said identification marks are embedded in the substrate, said radar pulse is transmitted into the substrate, and any echoes that are returned within a time window beginning a predetermined time after transmission of said radar pulse are detected.

9. A method as claimed in claim 8 wherein a series of radar pulses are transmitted into the substrate at different signal depths based on the timing of echo returns, until an echo return at a signal depth corresponding to the distance to the identification marks is received.

10. A method as claimed in claim 7 wherein said identification marks and said substrate are of different densities and said radar echoes are detected based on the density of the identification marks.

11. A method as claimed in claim 7 wherein said identification marks and said substrate are made of materials having different radar reflection characteristics, and said radar echoes are detected based on radar reflection characteristics of the identification marks.

12. A method as claimed in claim 7 wherein said marks comprise a two dimensional matrix symbol.

13. A method for sensing two-dimensional identification marks embedded within a substrate below a surface of the substrate, said method comprising:

using micropower impulse radar to transmit a high risetime, short duration pulse to a focussed radar target area of the substrate in which the two dimensional identification marks are embedded;

listening for radar echoes returned from the identification marks during a listening period occurring a predetermined time after transmission of said radar pulse, and, if no radar echoes are detected, sequentially transmitting further high risetime, short duration pulses;

listening for radar echoes from each of said further pulses after further, different times for each of the further pulses after transmission of each of the further pulses until radar echoes are detected; and processing data based on the detected radar echoes to produce an image of said identification marks.

14. A method as claimed in claim 13 wherein said marks comprise a two dimensional matrix symbol.

15. An apparatus for identifying radar reflective or absorptive machine-readable passive identification marks provided in a predetermined coded pattern on a substrate, said apparatus comprising:

a micropower impulse radar imager means for transmitting radar pulses to a target area including the radar reflective or adsorptive identification marks on the substrate and for receiving radar energy returned from the target area including the marks;

converter means for converting the returned radar energy into information signals;

computer means for analyzing said information signals to decode the coded pattern and to thus determine the information contained in the identification marks; and display means for displaying said information in a human-readable format.

16. An apparatus according to claim 15 wherein the radar imager means, converter means, computer means and display means are housed in a single miniaturized housing.

17. An apparatus according to claim 16 wherein the computer means stores, in memory, the information signals and decodes the stored information signals to produce a signal train representative of the identification marks.

18. An apparatus according to claim 17 wherein said computer means converts said signal train into an ASCII string for display by said display means.

* * * * *